United States Patent
Loce et al.

(10) Patent No.: US 7,224,489 B2
(45) Date of Patent: May 29, 2007

(54) FONT CHARACTERISTIC DRIVEN HALFTONING

(75) Inventors: Robert P. Loce, Webster, NY (US); Xiaoxue Cheng, Webster, NY (US); Gregory W. Zack, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 864 days.

(21) Appl. No.: 09/962,904

(22) Filed: Sep. 25, 2001

(65) Prior Publication Data

US 2003/0058474 A1  Mar. 27, 2003

(51) Int. Cl.
G06K 15/00 (2006.01)
H04N 1/405 (2006.01)
H04N 1/40 (2006.01)

(52) U.S. Cl. .................... 358/3.2; 358/3.01; 358/3.21
(58) Field of Classification Search ............... 358/1.9, 358/3.06, 3.15, 3.17, 3.2, 1.11, 538, 462, 358/470, 3.12; 382/139, 185, 176–179, 195, 382/197, 203, 187; 392/187, 203; 345/467, 345/471
See application file for complete search history.

(56) References Cited

U.S. PATENT DOCUMENTS

| | | | |
|---|---|---|---|
| 5,339,172 A * | 8/1994 | Robinson | 358/462 |
| 5,502,804 A * | 3/1996 | Butterfield et al. | 715/502 |
| 5,570,435 A * | 10/1996 | Bloomberg et al. | 382/283 |
| 5,767,978 A | 6/1998 | Revankar et al. | |
| 5,943,063 A * | 8/1999 | Dowling | 345/471 |
| 6,005,588 A * | 12/1999 | Guha | 345/467 |
| 6,006,013 A * | 12/1999 | Rumph et al. | 358/1.15 |
| 6,101,002 A * | 8/2000 | Urasawa | 358/3.13 |
| 6,101,514 A * | 8/2000 | Chan | 715/530 |
| 6,178,011 B1 | 1/2001 | Lin et al. | |
| 6,185,336 B1 | 2/2001 | Clark et al. | |
| 6,249,353 B1 * | 6/2001 | Yoshida et al. | 358/1.9 |
| 6,563,502 B1 * | 5/2003 | Dowling et al. | 345/469.1 |
| 6,661,921 B2 * | 12/2003 | Tanioka | 382/190 |
| 2004/0114804 A1 * | 6/2004 | Tanioka | 382/187 |

* cited by examiner

Primary Examiner—David Moore
Assistant Examiner—James A. Thompson
(74) Attorney, Agent, or Firm—Fay Sharpe LLP

(57) ABSTRACT

Characteristics of text or text components or features are considered when selecting halftoning screens. For example, an italic slant angle of text is recognized and used to select or generate a compatible halftone screen oriented at the same angle. A screen frequency may be selected based on a thickness of a text component. Descriptive tags associated with text or text components facilitate screen selection. Tags are assigned based on font descriptions included in a document during authoring. Alternatively, tags are assigned based on the results of document segmentation and character recognition techniques. An image processing system operative to consider characteristics of text or text components when selecting halftone screens includes a text component characteristic recognizer, a halftone screen selector and a halftoner. Optionally a print engine is also included. In a xerographic environment the print engine includes a xerographic printer.

21 Claims, 8 Drawing Sheets

FONT CHARACTERISTIC DRIVEN HALFTONING

BACKGROUND OF THE INVENTION

1. Field of the Invention

The invention is related generally to the art of halftoning text. It finds particular application where gray, colored, scanned, or anti-aliased text is to be halftoned. The invention will, for the most part, be described in terms of italic and non-italic text. However, it is to be understood that the invention can be usefully applied to accommodate other text and text characteristics.

2. Description of Related Art

When text includes gray or unsaturated features, a halftone screen used in preparing the text for rendering can have a significant effect on a perceived print quality of the text. For example, most text fonts have predominant components in vertical and horizontal orientations. For instance this—t—consists predominantly of vertical and horizontal orientated components. Therefore, printing systems often use halftone screens with vertical and horizontal orientations to halftone text, such as using a high frequency vertical line screen. Typically, these halftone screens combine with the predominant components of most text fonts to produce interactions of an unobjectionably high frequency.

However, when text fonts or font modifications include predominant components in non-vertical or non-horizontal orientations, the vertical/horizontal nature of a typical text halftone screen can interact with those non-vertical/non-horizontal components to yield displeasing rendering artifacts. For example, the halftoning of many italic fonts or font modifications is known to be problematic. Italicized text is commonly slanted at a slope of about four to one (4/1, or about fourteen degrees from the vertical). The predominant components of italicized text combine with vertically oriented line or dot screens to produce text with edges that appear rough or jagged. FIG. 1 includes an exaggerated example of this phenomenon. In FIG. 1 a magnified 14 point, 50% gray level, italic letter "K" is rendered with a prior art, vertically oriented, line screen. Where the line screen interacts with a slanted edge or contour of the letter, the edge appears jagged.

The same or similar phenomena occur when halftoning certain portions of Roman (generally vertically and horizontally oriented) fonts. For example, the letters A, K, M, N, V, W, X, Y, and Z all contain diagonal features or components that are often rendered with a jagged appearance. Similarly, some curved portions of characters such as, S, P, B D, O, U, Q, G and C can interact poorly with the prior art vertical and horizontal oriented screening methods. The phenomenon generally leads to objectionable rendering results when text is gray, unsaturated color, anti-aliased, or possesses gray edges, for example, as a result of a scanning process.

For the forgoing reasons, there has been a desire to provide a text halftoning system that reduces or eliminates jaggedness in halftoned text.

BRIEF SUMMARY OF THE INVENTION

To that end, a method and apparatus have been developed that are operative to select and apply halftone screens that are compatible with target text components. In one embodiment the method comprises determining a rendering quality related characteristic of the text component, selecting a halftone screen based on a compatibility with the rendering quality related characteristic of the text component, and halftoning the text component with the selected halftone screen. Examples of rendering quality related characteristics include, but are not limited to, font type, font size, character component thickness, character component orientation, character component shape, character component curvature, character component slant, and character component color.

In another embodiment the invention includes a method of improving a rendering quality of gray, colored, anti-aliased or scanned text. The method comprises tagging italic text in a document, selecting a halftone screen based on whether or not the text is tagged as italic, and halftoning the text with the selected halftone screen. In some embodiments selecting a halftone screen based on whether or not the text is tagged as italic comprises selecting a halftone screen with a screen angle that matches a slant angle of the text tagged as italic. In some embodiments selecting a halftone screen based on whether or not the text is tagged as italic comprises selecting a halftone screen with a screen angle that is perpendicular to a slant angle of the text tagged as italic.

An image processor operative to halftone text based on a text component characteristic comprises a text component characteristic recognizer operative to recognize rendering quality affecting characteristics of text components, a halftone screen selector operative to communicate with the text component characteristic recognizer and select a halftone screen based on a text component characteristic or feature recognized by the text component characteristic recognizer, and a halftoner operative to use the selected halftone screen to create a halftone version of the text component.

An advantage of the present invention is found in a reduction or elimination of halftone generated jaggedness in gray, unsaturated color, scanned or anti-aliased text.

Another advantage of the present invention resides in an improved rendering of italic text.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

DETAILED DESCRIPTION OF THE INVENTION

Figure 1:
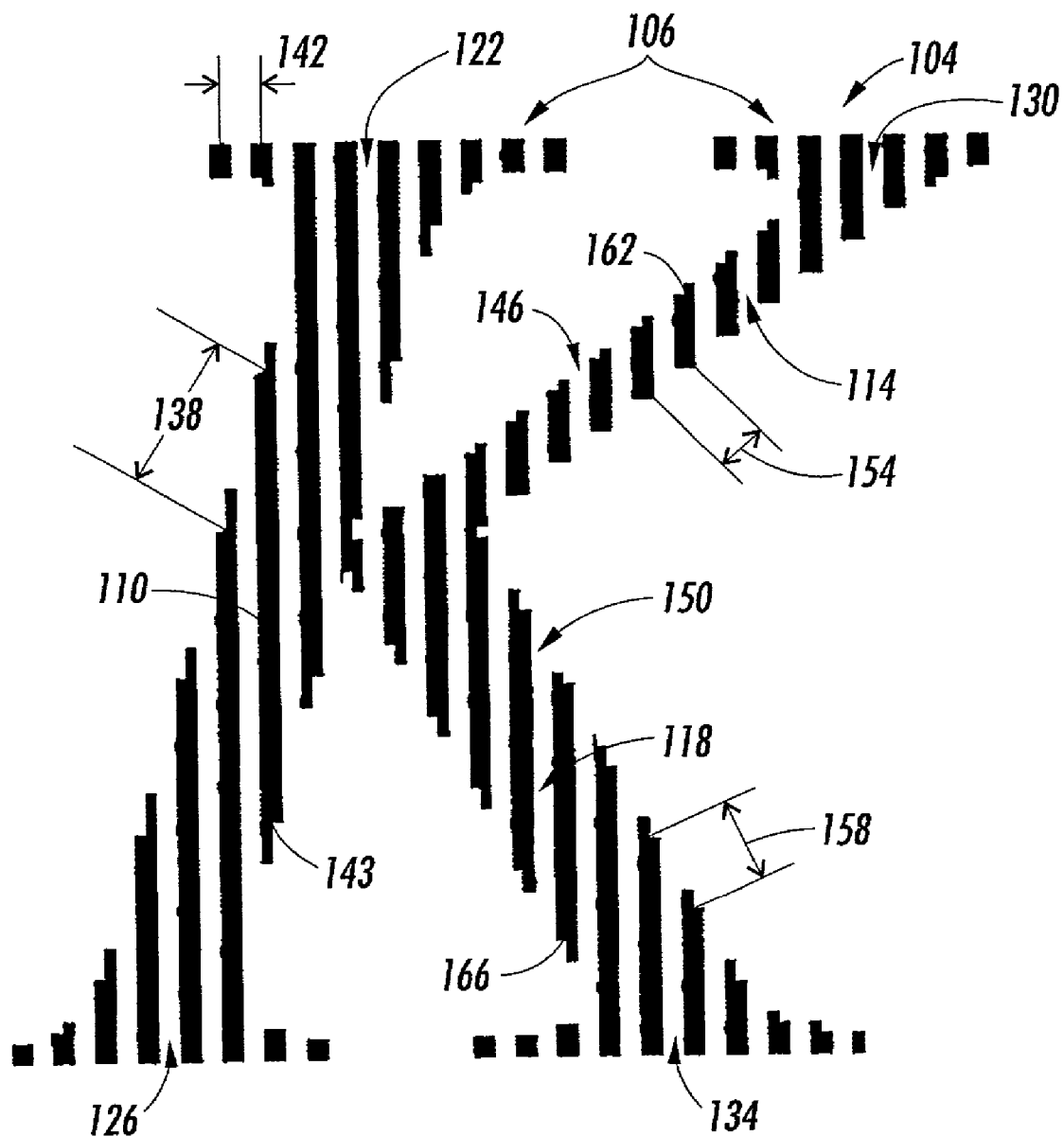
FIG. 1 is a magnified view of an italic letter halftoned with a prior art method.

Referring to FIG. 1 a magnified 14-point, 50% gray level, italic letter "K" 104 is halftoned with a prior art method including the use of a vertically oriented line screen 106. The 14-point, 50% gray level, italic letter "K" 104 is made up of a plurality of character components including a main body 110, and upper arm 114 and a lower arm 118. The main body 110 terminates in a main cap 122 and a main foot 126. The upper arm 114 terminates in an upper cap 130. The lower arm 118 terminates in a lower foot 134. The main body 110 is slanted at about 14 degrees from vertical (4/1 slant). As a result of this feature or characteristic, along the edge or contour of the main body 110 there is an apparent center-to-center distance 138 between lines of the line screen that is over four times the actual (horizontal) distance between the lines (shown at 142). Additionally, partial overlap between main body 110 edge or contour pixels of the 50% gray level, italic letter "K" 104 and dots of halftone cells of the vertical line screen 106, lead to partial halftone structure 143 and jaggedness in the vertical lines of the line screen 106. Even at normal magnification, the large apparent center-to-center distance 138 and the partial halftone structure 143 caused by the incompatibility between the slant angle of the main body 110 and the screen angle of the vertical line screen 106 can give the main body 110 of the 50% gray level, italic letter "K" a sloppy and jagged appearance. Additionally, partial halftone structure can lead to other problems. For example, partial halftone structure can lead to unreliable print density as compared to a standard halftone shape.

The upper arm 114 and lower arm 118 also suffer from a rough or jagged appearance. However, they 114, 118 are at 53 and −62 degrees respectively, from vertical. As a result, as those skilled in the art will appreciate, interactions between edges 146, 150 of the upper 114 and lower arms 118 and the vertical line screen 106 are not as severe. Apparent center-to-center distances 154, 158 at the edges 146, 150 of the arms 114, 118, while still large, are not as large as the apparent center-to-center distance 138 in the main body 110. Additionally, the partial halftone structure 162, 166 of the vertical line screen 106 in the arms 114, 118, while not as large as the partial halftone structure 143 of the vertical line screen 106 in the main body 110 is still objectionable. The caps 122, 130 and feet 126, 134 of the prior art, 50% gray level, italic letter "K" 104 have a generally horizontal structure. Therefore the caps and feet 122, 130, 126, 134 are generally perpendicular to the vertical line screen. As is known in the art, this perpendicular relationship is beneficial, since it leads to a high or maximal and unobjectionable interaction frequency. This benefit is apparent in FIG. 1 wherein the edges of the caps and feet 122, 130, 126, 134 are smooth and the lines of the vertical line screen 106 do not suffer from partial halftone structure and the apparent center-to-center distance is the actual center-to-center distance 142.

Figure 2:
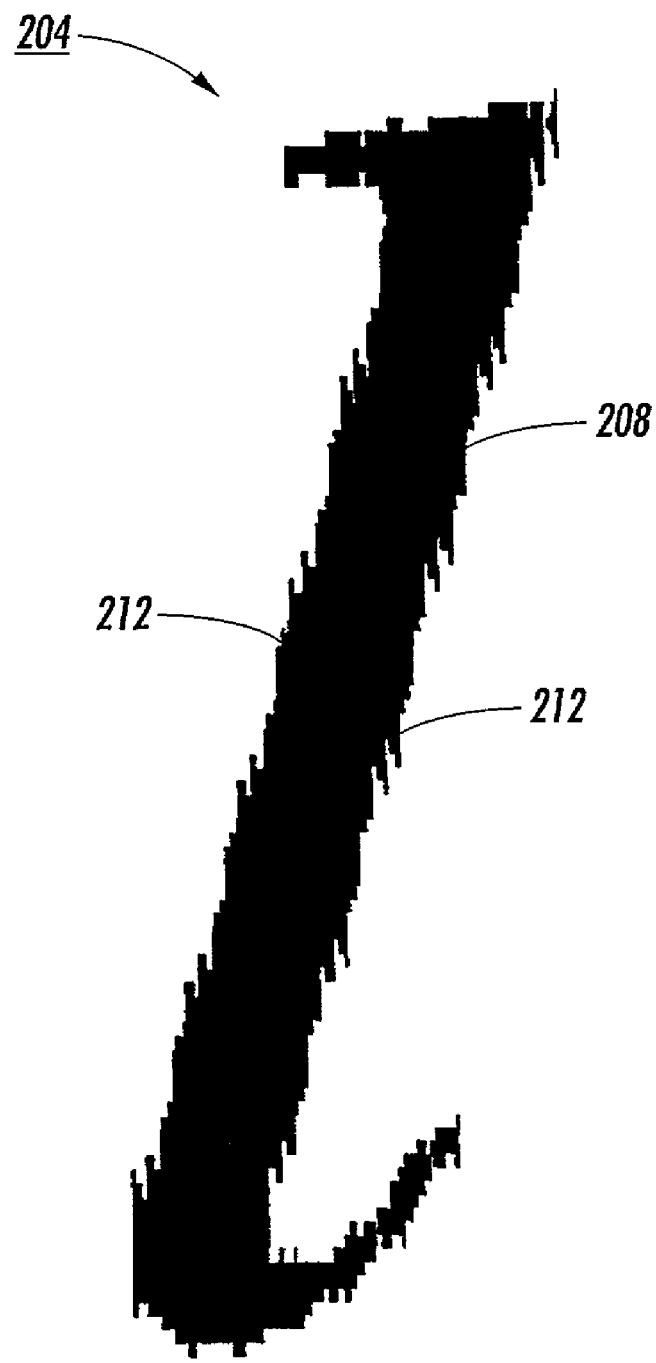
FIG. 2 is a magnified view of an anti-aliased character halftoned with a prior art method.

Referring to FIG. 2, a prior art anti-aliased italic "l" 204 is rendered with a fuzzy or jagged appearance 212. A main body 208 of the prior art anti-aliased italic "l" 204 is fully saturated or 100% black. However, at the edge or contour of the prior art anti-aliased italic "l" 204, pixels that were only fractionally included in the character were coded as a gray level. For reasons similar to those described in reference to FIG. 1 those gray level pixels lead to a fuzzy or jagged appearance 212 when halftoned through prior art methods.

Figure 3:
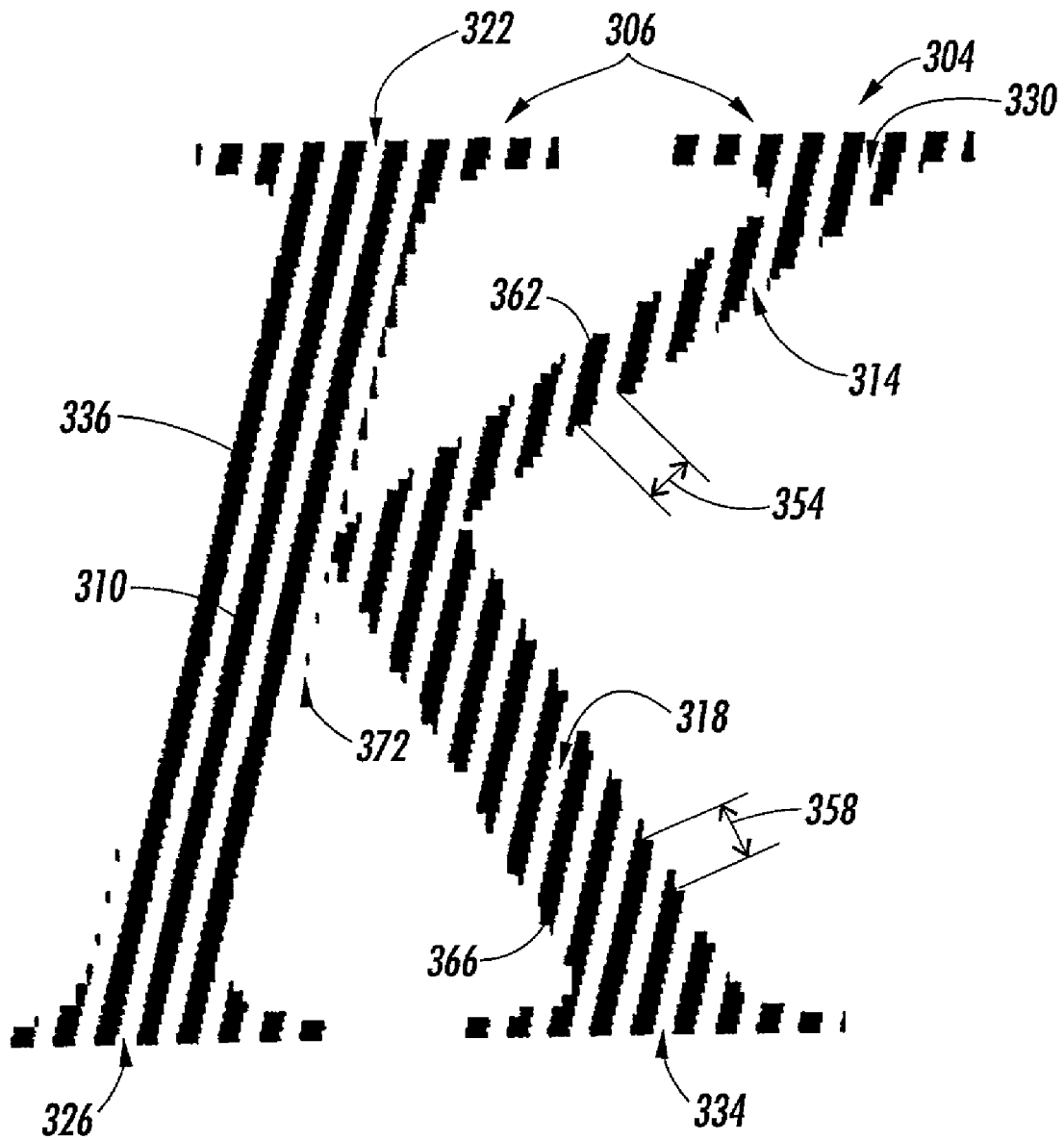
FIG. 3 is a magnified view of an italic letter halftoned with a halftone screen selected for compatibility with features or characteristics of components of the italic letter.

Referring to FIG. 3, a magnified 14-point, 50% gray level, italic letter "K" 304 is halftoned with an improved halftoning system including the selection and use of a character component feature oriented line screen 306. The enlarged 14-point, 50% gray level, italic letter "K" 304 is made up of a plurality of character components including a main body 310, and upper arm 314 and a lower arm 318. The main body 310 terminates in a main cap 322 and a main foot 326. The upper arm 314 terminates in an upper cap 330. The lower arm 318 terminates in a lower foot 334. The main body 310 is slanted about 14 degrees from vertical (4/1). The character component feature oriented line screen 306 is also slanted at about 14 degrees from vertical. The character component feature oriented line screen 306 is selected or generated for its compatibility with a feature of a predominant character component of the 50% gray level, italic letter "K" 304. The character component feature oriented line screen 306 was selected for a zero interaction frequency relationship with an edge 336 or contour of the slanted main body 310 of the 50% gray level, italic letter "K" 304. As a result, the edge 336 or contour of the main body 310 is rendered with a smooth solid line. Therefore, there is no detrimental increased apparent center-to-center distance between lines of the line screen along the edge 336 or contour of the main body 310; and the main body is given a high quality, sharp, smooth appearance. Additionally, partial overlap between main body edge 336 or contour pixels and dots of halftone cells of the character component feature oriented line screen 306 does not exist. Additionally, partial halftone structure and jaggedness in the line screen on the edge 336 are done away with.

The upper arm 314 and lower arm 318 are at angles of about 39 and 48 degrees with the character feature oriented line screen 306. As a result, the upper arm 314 and lower arm 318 do not fully benefit from the use of the character feature oriented line screen 306. Nevertheless, at these nearly 45 degree relative orientations the character component feature oriented line screen 306 is a good compromise screen for halftoning these character components 314, 318. Apparent center-to-center distances 354, 356 along the edges of the upper and lower arms 314, 318 are reduced in comparison to apparent center-to-center distances 154, 158 of the arms 114, 118 of the prior art "K" 104. Furthermore, partial halftone structure 362, 366 in the arms 314, 318 are less significant and/or are distributed more evenly as compared to the partial halftone structure 162, 166 of the prior art "K" 104.

The caps 322, 330 and feet 326, 334 of the 50% gray level, italic letter "K" 304 have a generally horizontal structure. Therefore the caps and feet 322, 330, 326, 334 are generally at 14 degrees to the character feature oriented line screen 306. Therefore, the quality of the caps and feet 322, 330, 326, 334 are degraded somewhat by the use of the character feature oriented line screen 306, which was selected for compatibility with the main body 310 and not for compatibility with the caps and feet 322, 330, 326, 334. However, the caps and feet 322, 330, 326, 334 are relatively small features. Therefore, the improvement in the stem or main body 310 appearance outweighs any loss in quality in serifs such as the caps and feet 322, 330, 326, 334. For example, a slight increase in inner surface jaggedness on the caps and feet may not even be noticeable when the 50% gray level, italic letter "K" 304 is rendered at a normal size. At normal magnification, the compatibility between the slant angle of the main body 310 and the screen angle of the character feature oriented line screen 306 create a 50% gray level, italic letter "K" that is sharp and pleasing to the eye. The improvement in the appearance of the main body 310 and the arms 314, 318 far out weigh any possible degradation to the feet 326, 334 and caps 322, 330. Additionally, lower case italics generally do not retain the serifs that are present in the corresponding Roman or non-italic characters. Therefore, in the case of italics, serif degradation that might occur is even less important.

However, if even further improvement in character appearance is desired, other or additional screens can be used. For instance, a screen having a horizontal or vertical orientation can be used to halftone the caps and feet components. Additionally, screens selected for compatibility with the upper arm and lower arm respectively could also be used. For further improvement screens can be selected not just for screen angle compatibility but also for screen frequency compatibility. For instance, while the screen used to render the 50% gray level, italic letter "K" 304 lines up well with the outer edge 336 of the main body 310 the lines of the screen do not coincide as well with the inner edge 374 of the main body 310. A screen can be selected to have a screen frequency or period that is in closer harmony with the width or thickness of the main body 310. Such a selection would provide a "K" with both crisp inner and outer main body edges.

Figure 4:
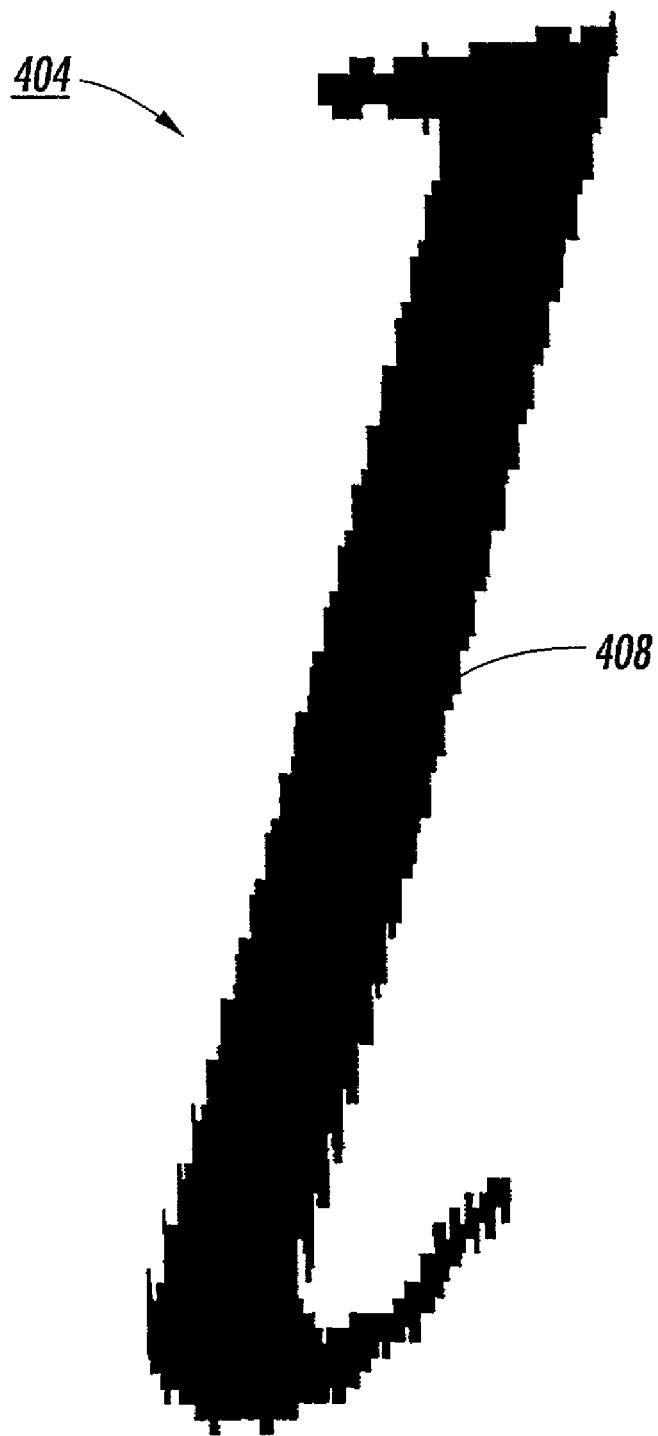
FIG. 4 is a magnified view of an anti-aliased character halftoned with a halftone screen selected for compatibility with features of components of the character.

Referring to FIG. 4, an anti-aliased italic "l" 404 is rendered with a smoother appearance as compared to the prior art anti-aliased italic "l" 204. A main body 408 of the anti-aliased italic "l" 404 is fully saturated or 100% black. At the edge or contour of the anti-aliased italic "l" 404 pixels that are only fractionally included in the character were coded as a gray level. A character feature compatible screen was selected and used to halftone the edge or contour pixels. As a result the anti-aliased italic "l" 404 is rendered without the jagged appearance 212 of the prior art anti-aliased italic "l" 204.

Line screens are not the only kinds of screens that can be selected for character component compatibility. Other screens can be similarly selected for text component feature compatibility. For example, dot screens can also be selected for character component characteristic compatibility, and applied as described above to better halftone gray, scanned, anti-aliased, and other unsaturated text.

Figure 5:
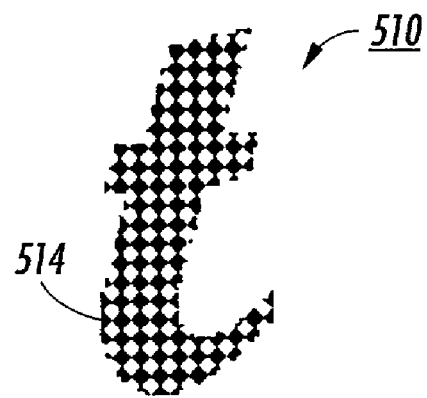
FIG. 5 is a magnified view of a character from a font having rounded text components halftoned with a prior art method.
Figure 6:
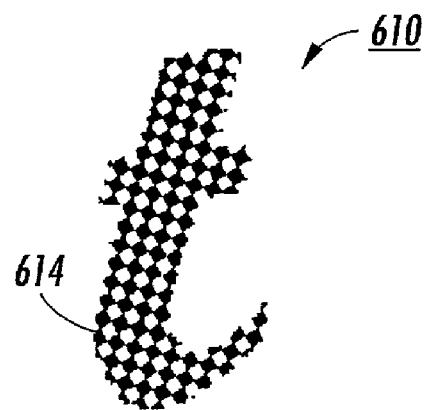
FIG. 6 is a magnified view of a character from a font having rounded text components halftoned with a halftone screen selected for compatibility with features of components of the character.

FIG. 5 and FIG. 6 illustrate a font with a relatively high degree of curvature. The font benefits from a selective application of a font compatible dot screen. In FIG. 5 a magnified 50% gray, Script MT Bold, lowercase "t" 510 is screened with a 90-degree dot screen. The character 510 is somewhat distorted by the 90-degree dot screen. For example, in a region of relative curvature, the 90-degree line screen gives the lower case "t" a sudden flat spot 514. In contrast, the lowercase "t" 610 of FIG. 6, which is beneficially screened with a 75-degree dot screen (selected for a relative compatibility with the curvature of a lowercase Script MT BOLD "t"), appears relatively curved in a region 614 corresponding to the flat spot 514.

Figure 7:
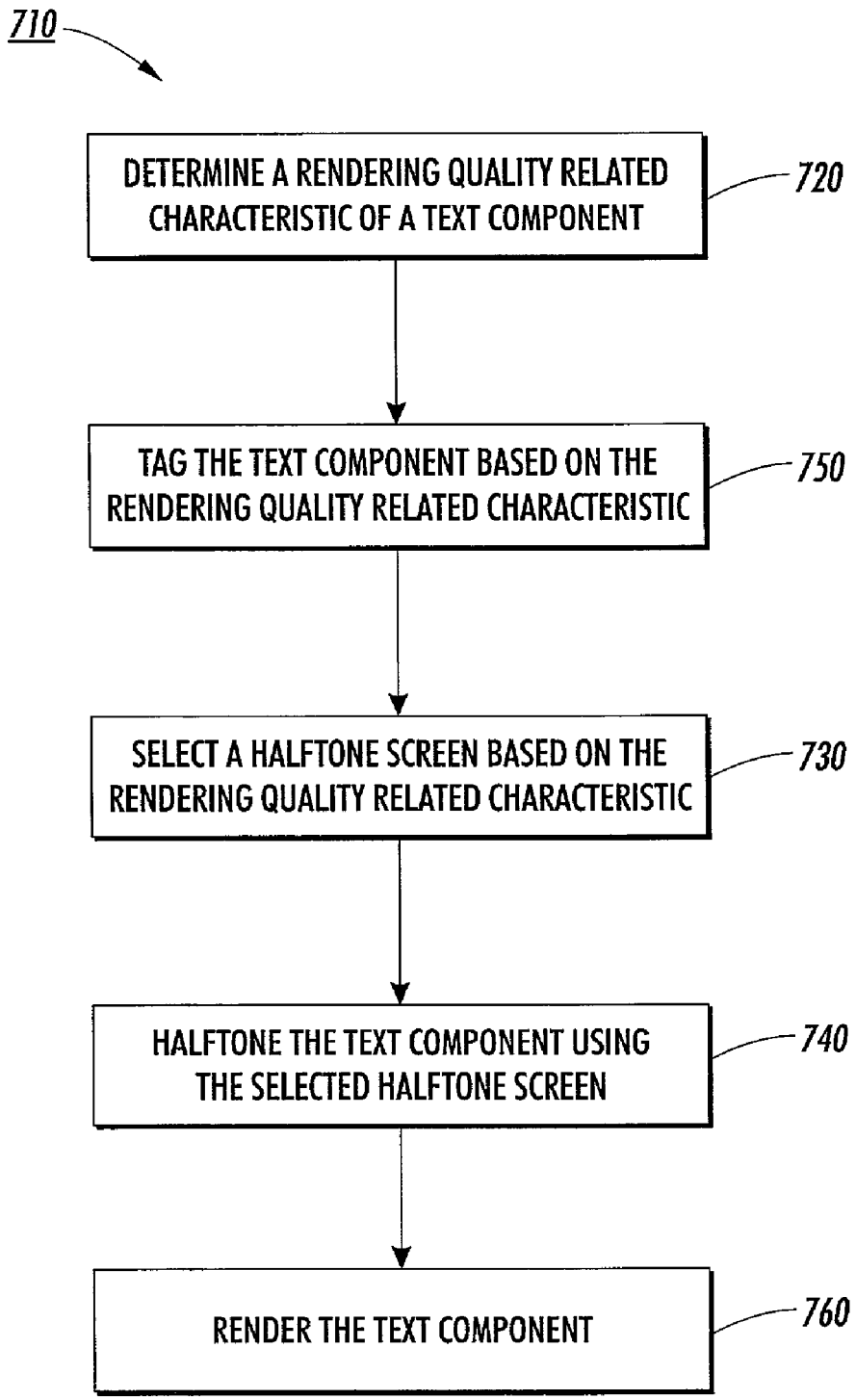
FIG. 7 is a flow chart outlining a method for halftoning text with halftone screens selected for compatibility with the characteristics of text components.

Referring to FIG. 7, a method 710 of halftoning, operative to yield the improved rendering quality of FIG. 3, FIG. 4 and FIG. 6 includes determining a rendering quality related characteristic or feature of a text component 720, selecting a halftone screen 730 based on a compatibility with the rendering quality related characteristic of the text component, and halftoning the text component with the selected halftone screen 740. Optionally, the method may be implemented through the use of component or pixel tagging 750.

Many documents are created with electronic authoring tools. For example, in a xerographic or reprographic environment, documents are created or made ready for rendering with a device called a Digital Front End (DFE). In a personal computer environment documents are created with word processing programs. When these tools are used, an author specifies (either by default or active selection) characteristics for the text used in the document. These specifications become part of the document. For example, an author specifies a font, a character size or point value, a character shade or color, and whether or not a character is bold, underlined and/or italic. An interaction between these characteristics and a halftone screen used in preparing the document for rendering, can influence the quality of a rendered or printed version of the document. For instance, some fonts may be more forgiving of halftoning methods and rendering device characteristics than others. For example, fonts that include relatively thick characters may hide edge artifacts better than fonts that include thin or hollow characters. Additionally, as illustrated above, fonts that have a characteristic curves or slants, such as, for example, some Script MT BOLD, Commercial Script BT, Kaufmann BD BT, and italic fonts in general, or fonts that are modified to be in italic form, have characteristics that can influence the quality of rendering or printing.

Therefore, determining a rendering quality related characteristic of the text component 720 can include, for example, reading a font specification or definition associated with a text component (for example, from a page description language version of a document, such as, for example, a PostScript version of a document), or reading whether or not the text component is italic from descriptive data stored in or with the source document.

Alternatively, where explicit descriptive data is not available, such as, for example, where a document is made available to an image or document processing system only as a scanned image, determining a rendering quality related characteristic of the text component 720 can include, for example, determining a predominant angle of a text component or determining a predominant dimension of the text component. Predominant angles and predominant dimensions are determined, for example, by analyzing a distribution of darkened pixels in the scanned image data. For instance, measurements are made through character recognitions techniques, such as character contour mapping and/or skeletonization processes.

Once a rendering quality related characteristic of a text component has been determined, it is preferable to tag 750 the text component, or constituent pixels of the text component, as being associated with that characteristic. For example, during a rasterization process a descriptive data or omega plane, associated with image pixels that describe a document image, contains rendering quality related characteristic descriptive bits. For instance, for each pixel in an image, a bit in the descriptive data or omega plane is set if the pixel is associated with an italic character. The bit is reset if the pixel is not associated with an italic character. Of course, the meaning associated with the sense of the bits is arbitrary and can be reversed in some embodiments.

Whether tagging is used to communicate the rendering quality related characteristics of the text component or some other communication means is used, the determined rendering quality related characteristic information is used to guide the selection 730 or generation of a halftone screen to be used in the halftoning of the text component. For example, where a bit is set indicating that a pixel is part of a slanted italic text component, a halftone screen is generated having a screen angle that coincides with the slant angle of the text component. Alternatively, or additionally, where omega plane bits indicate a dimension such as a thickness or width of a text component (or where that information is otherwise communicated), a halftone screen having a screen frequency that causes halftone dots or lines to fall compatibly on the edges of the text component is generated.

The selected or generated halftone screen is used to halftone 740 the text component. The text component may be a block of text, a single text character, or as illustrated above, a text component can be a portion of a character, such as, for example, a main body, an arm or a foot. In a rounded character, such as, for example the letter—O—certain segments of the character can be considered text components. For example, the letter—O—can be treated as comprising eight text components; a top, a bottom, a left side a right side, and four slanted portions interconnecting the sides with the top and bottom. The number of subdivisions used is a trade off between a desired rendering quality and an available processing power or a tolerable halftoning or rendering speed.

The halftoned text component is printed 760 or stored for later processing.

In the case of color (for example, CMYK) text, it is preferable to select or generate colorant screens oriented in a dot-off-dot or line-off-line manner, at an angle (such as, for example, the italic slant angle) that is compatible with a high quality rendering of the text component. Additionally, it is preferable to select third and fourth colorant screens (if required) that are orthogonal to the first and second screens. The third and fourth screens are preferably also oriented in a dot-off-dot or line-off-line manner. However, the invention is still effective where line-on-line and dot-on-dot screening techniques are used.

Figure 8:
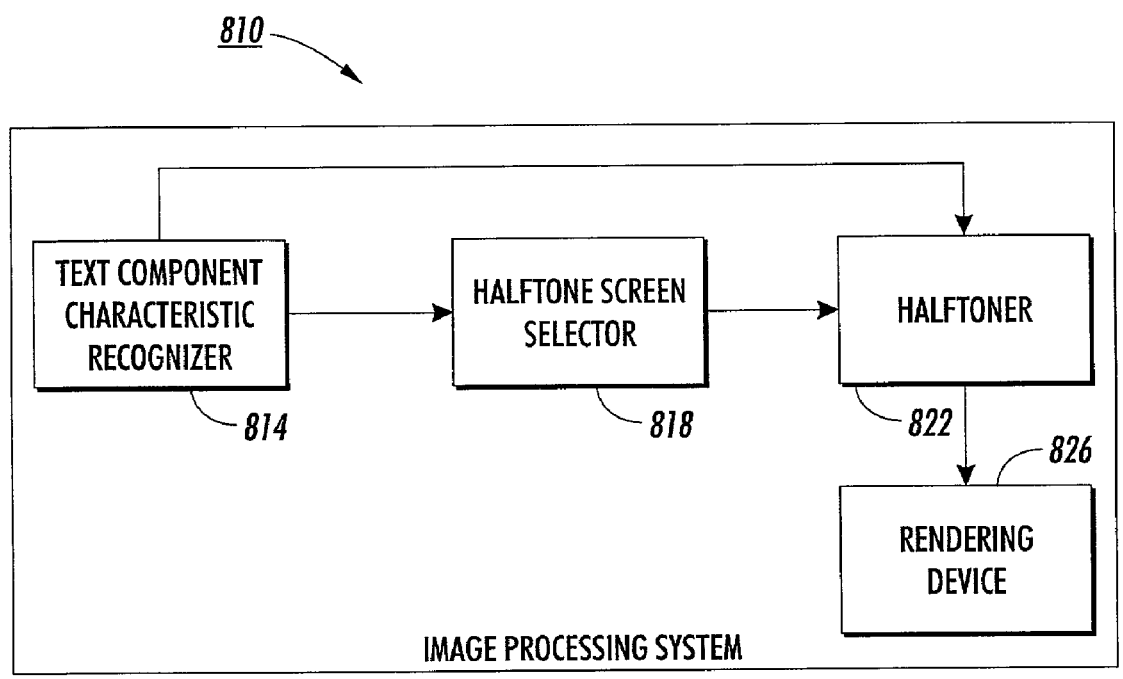
FIG. 8 is a block diagram of a portion of an image processing system operative to halftone text by the method of FIG. 7.

Referring to FIG. 8, an image processing system 810 operative to perform the method 710 of halftoning described above includes a text component feature or characteristic recognizer 814, a halftone screen selector 818 or generator, a halftoner 822 and a rendering device 826.

The text feature or component characteristic recognizer 814 receives an image or document from an image source (not shown), such as, for example, a document authoring tool, a computer network, a computer data storage device, or a scanner.

The text feature characteristic recognizer reviews the document to determine if any portions of the document should be halftoned with a characteristic compatible halftone screen. For example, the text feature or component characteristic recognizer 814 reviews an omega channel or descriptive data plane associated with the document. The review is a search tags indicating that related pixels are associated with text components having a rendering quality related characteristic. Alternatively, the text component feature or characteristic recognizer 814 does not rely on tag information. Instead the text feature or component characteristic recognizer 814 is an image or document analyzer, which locates and analyzes text related pixels. Through document segmentation and character recognition techniques such as, for example, contour mapping and character skeletonization, the text component feature or characteristic recognizer 814 measures text characters or components in search of rendering quality related characteristics. For example, contour mapping and skeletonization are used to determine text component orientation or slant angle, text component curvature, and text component dimensions or thickness.

Whether the text component feature or characteristic recognizer 814 simply recognizes characteristic labeling tags, or analyzes document text components at the pixel level, the text feature or component characteristic recognizer 814 passes recognized characteristic information to the halftone screen selector or generator 818. The text feature or component characteristic recognizer 814 also passes image or document pixel information to the halftoner 822.

The halftone screen selector or generator 818 either selects a screen from a database of available screens or generates a screen for halftoning a particular text component in real time. For example, rendering quality related characteristics, such as, for instance, component slant angle, component curvature and component thickness, are used as indices into a halftone screen database or are used to generate database keys. Alternatively, the rendering quality related characteristics and other data are used as parameters in a halftone threshold generating function. For example, component slant angle and component thickness information are used, along with pixel position information (such as a character component location relative to a page, and a pixel location within the character component) to generate a halftone threshold for a particular pixel.

In either case, for a given pixel, a halftone screen threshold is passed to the halftoner 822. The halftoner 822 compares the threshold information to a pixel gray level (whether the pixel gray level represents a black and white gray level or a saturation level of a color separation) and generates a binary marking decision. A plurality of such decisions are made for pixels throughout the document and are either stored locally in a computer storage device (not shown), transmitted electronically to some other device, or delivered to the rendering device 826.

In a xerographic environment, the rendering device 826 is a xerographic printer. Xerographic printers are known to comprise an imaging member, a fuser and a developer. In other environments, other kinds of rendering devices may be used. For example, the rendering device 826 may be an ink jet printer.

Figure 9:
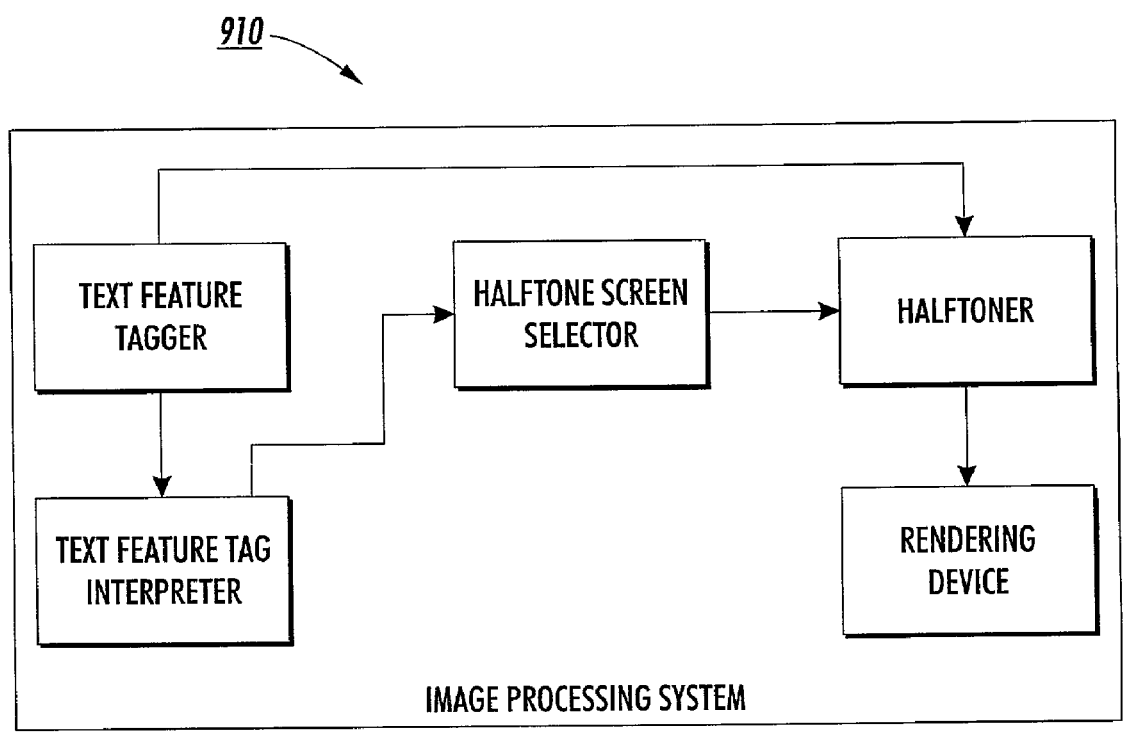
FIG. 9 is a block diagram of a portion of another image processing system operative to halftone text by the method of FIG. 7.

Referring to FIG. 9, an image processing system embodiment 910 where a text feature characteristic recognizer includes a text feature tag interpreter 914 may also include a text feature tagger 918. In that case, it is the text feature tagger 918 that first receives a document from a document source. When available, the text feature tagger 918 reviews font definitions and other descriptive information (for example, as found in a page description language (PDL) of a document) that is associated with the document. When the text feature tagger 918 finds a font definition or font modification (such as an italic font or italic font modification) related to anticipated rendering quality related text component characteristic, the text feature tagger 918 sets one or more bits associated with that anticipated quality related characteristic. For example, as the document is rasterized, each generated pixel is associated with a bit or bits in one or more description or omega planes. The descriptor or omega plane bits are associated with rendering quality related characteristics. For example, one of the bits indicates whether or not an associated pixel is part of an italic text component. Other bits may indicate, for example, point size, font slant, font curvature or individual character component size and orientation. As mentioned above, when a pixel is generated (in the rasterization process) that is associated with a rendering quality related characteristic (such as italics, font slant, component size, etc.) a corresponding bit in a descriptor or omega plane is set. When a pixel is generated that is not associated with a rendering quality related characteristic, the related bits in the descriptor or omega planes that are associated with that pixel are left in the reset state. When the image pixel and omega plane information is prepared, the image pixels and omega plane bits are passed to the halftoner 822 and text feature tag interpreter 914 respectively. Alternatively, as described above, the text feature tagger 918 performs document segmentation and character recognition procedures in search of rendering quality related characteristics and sets descriptor or omega plane bits accordingly.

The text feature tag interpreter 914 reads tag or omega plane bits and transforms the information contained within the bits into a form that is understood by the halftone screen selector 818. The halftone screen selector or generator 818 either selects a screen from a database of available screens, or generates a screen for halftoning the pixel associated with the tag, in real time and in a manner synchronized with the halftoner 882, as the halftoner 822 is ready to process the pixel. From this point processing proceeds as described in reference to FIG. 8.

Preferably the text component characteristic recognizer 814 (whether it includes text feature tag interpreter 914 or not), halftone screen selector 818, halftoner 822 and when included the text feature tagger 918 are all implemented in software. They may be run on the same or different computational devices such as, for example, the same or different microprocessors or digital signal processors. The text component characteristic recognizer 814 maybe part of a digital front end (DFE), or it may be part of, or benefit from the services of, a document or page segmenter and/or character recognizer. Additionally the text component characteristic recognizer 814 may be part of or work in close association with a rasterizer. The text feature tag interpreter 914 and halftone screen selector 818, while illustrated as separate from the halftoner 822 may be considered to be part of the halftoner. Furthermore, the method 710 for halftoning may be implemented and organized in different functional blocks and the functional blocks may be implemented in hardware or a combination of hardware and software.

The invention has been described with reference to particular embodiments. Other, modifications and alterations will occur to others upon reading and understanding this specification. It is intended that all such modifications and alterations are included insofar as they come within the scope of the appended claims or equivalents thereof.

What is claimed is:

1. A method of halftoning a text component, the method comprising:
    determining a rendering quality related characteristic of the text component including at least one of a text component: orientation, slant angle, curvature, dimension and thickness;
    selecting or generating a halftone screen having at least one of: a screen angle that closely matches, or is orthogonal to or nearly orthogonal to, the orientation or slant angle of the text component, and a screen frequency such that halftone lines, dots or structures of the screen fall compatibly on edges of the text component based on the curvature, dimension and/or thickness of the text component, and
    halftoning the text component with the selected or generated halftone screen.

2. The method of halftoning a text component of claim 1 wherein determining a rendering quality related characteristic of the text component comprises:
    determining a font type of the text component.

3. The method of halftoning a text component of claim 1 wherein determining a rendering quality related characteristic of the text comprises:
    determining a font modification associated with the text component.

4. The method of halftoning a text component of claim 1 wherein determining a rendering quality related characteristic of the text comprises:
    determining a predominant angle of the text component.

5. The method of halftoning a text component of claim 1 wherein determining a rendering quality related characteristic of the text component comprises:
    determining a predominant dimension of the text component.

6. The method of halftoning a text component of claim 1 wherein selecting a halftone screen comprises:
    selecting a halftone screen that is compatible with a predominant angle of the text component.

7. The method of halftoning a text component of claim 1 wherein selecting a halftone screen comprises:
    selecting a halftone screen having a screen frequency such that halftone lines, dots or structures of the screen fall compatibly on edges of the text component.

8. A method of improving a rendering quality of gray, colored, anti-aliased or scanned text, the method comprising:
    tagging italic text in the document;
    selecting a halftone screen that is compatibly aligned with the text based on whether or not the text is tagged as italic, and
    halftoning the text with the selected halftone screen.

9. The method of improving a rendering quality of gray, colored, anti-aliased or scanned text of claim 8 wherein selecting a halftone screen comprises:
    selecting a halftone screen with a screen angle that matches a slant angle of the text tagged as italic.

10. The method of improving a rendering quality of gray, colored, anti-aliased or scanned text of claim 8 wherein selecting a halftone screen comprises:
    selecting a halftone screen with a screen angle that is perpendicular to a slant angle of the text tagged as italic.

11. An image processor operative to halftone text based on a text component characteristic, the image processor comprising:
    a text component characteristic recognizer operative to recognize rendering quality affecting characteristics of text features including at least one of a text component: orientation, slant angle, curvature, dimension and thickness;
    a halftone screen selector operative to communicate with the text component characteristic recognizer and select a halftone screen having at least one of: a screen angle that closely matches, or is orthogonal to or nearly orthogonal to, the orientation or slant angle of the text component, and a screen frequency such that halftone lines, dots or structures of the screen fall compatibly on edges of the text component based on the curvature, dimension and/or thickness of the text component;
    a halftoner operative to use the selected halftone screen to create a halftone version of the text component.

12. The image processor of claim 11 wherein the text component characteristic recognizer comprises:

a text feature tag interpreter.

13. The image processor of claim 12 further comprising:
a text feature tagger operative to tag pixels that make up a text component based on characteristics of the text component.

14. The image processor of claim 13 wherein the text feature tagger comprises:
a text angle tagger operative to tag pixels that make up a text component based on a predominant angle of the text component.

15. The image processor of claim 13 wherein the text feature tagger comprises:
a text thickness tagger operative to tag pixels that make up a text component based on a predominant thickness of the text component.

16. The image processor of claim 11 wherein the text component characteristic recognizer comprises:
a text component slope evaluator operative to determine a predominant slope of a text feature.

17. The image processor of claim 11 wherein the text component characteristic recognizer comprises:
a text component thickness evaluator operative to determine a predominant thickness of a text feature.

18. The image processor of claim 11 wherein the halftone screen selector comprise:
a halftone screen angle selector operative to specify a screen angle based on a predominant angle of a text component.

19. The image processor of claim 11 wherein the halftone screen selector comprises:
a halftone screen frequency selector operative to specify a screen frequency based on a predominant thickness of a text component.

20. The image processor of claim 11 further comprising:
a rendering device operative to render the halftone version of the text component.

21. The image processor of claim 20 wherein the rendering device comprises a xerographic printer.

* * * * *